United States Patent [19]
Toyoda et al.

[11] Patent Number: 6,133,490
[45] Date of Patent: Oct. 17, 2000

[54] DISPERSANT FOR PIGMENTS FOR AROMATIC POLYMERS

[75] Inventors: Hideo Toyoda, Iwakuni; Hideki Sakai, Hiroshima; Kenichi Morizono; Toshiyuki Tsutsui, both of Ohtake, all of Japan

[73] Assignee: Mitsui Chemicals Inc., Tokyo, Japan

[21] Appl. No.: 09/155,479

[22] PCT Filed: Jan. 29, 1998

[86] PCT No.: PCT/JP98/00374

§ 371 Date: Sep. 29, 1998

§ 102(e) Date: Sep. 29, 1998

[87] PCT Pub. No.: WO98/33852

PCT Pub. Date: Aug. 6, 1998

[30] Foreign Application Priority Data

Jan. 30, 1997 [JP] Japan .................................. 9-017091
Dec. 8, 1997 [JP] Japan .................................. 9-337343

[51] Int. Cl.[7] .......................... C10L 1/16; C10M 101/02; C10M 107/00; C10M 143/00; C10G 73/36
[52] U.S. Cl. ................. 585/9; 585/10; 585/11; 585/12; 208/20
[58] Field of Search ............... 585/9–12; 208/20

[56] References Cited

U.S. PATENT DOCUMENTS 4,010,006  3/1977  Price ............................................ 44/62
4,952,738  8/1990  Gessell et al. ............................... 585/3

FOREIGN PATENT DOCUMENTS 50-123147   9/1975   Japan .
58-103530   6/1983   Japan .
59-219370  12/1984   Japan .
 6172546    6/1994   Japan .

Primary Examiner—Marian C. Knode
Assistant Examiner—Thuan D. Dang

[57] ABSTRACT

A dispersant for pigments for aromatic polymers, which is superior not only in the ability of dispersing pigments in aromatic polymers but also in attaining high transparency and stability of the resulting color, while avoiding grafting step and attaining a lower production cost. The dispersant for pigments for aromatic polymers comprises a wax composed of a random copolymer of ethylene with an aromatic vinyl compound, which has a content of structural unit derived from ethylene of 99–10% by weight and a content of structural unit derived form the aromatic vinyl compound of 1–90% by weight and exhibiting an intrinsic viscosity of 0.04–0.6 dl/g.

8 Claims, No Drawings

DISPERSANT FOR PIGMENTS FOR AROMATIC POLYMERS

FIELD OF THE TECHNIQUE

The present invention relates to a dispersant for dispersing pigments in aromatic polymers, which comprises a wax of copolymer of ethylene with an aromatic vinyl compound.

BACKGROUND OF THE TECHNIQUE

For coloring an aromatic polymers, such as polystyrene, styrene/acrylonitrile copolymer (AS) and styrene/acrylonitrile/butadiene copolymer (ABS), there have been employed principally dry coloring, color compounding and masterbatch preparation. All these techniques employ a dispersant for dispersing the pigments uniformly over the polymer mass.

Japanese Patent Kokai Sho 58-103530 A discloses a dispersant for pigments for polymers based on styrene, which comprises a grafted polyolefin wax obtained by grafting a styrene-based compound onto a polyolefin wax. While this pigment dispersant excels in the performances for dispersing pigments and the like, it requires two process steps of polyolefin synthesis and grafting of styrene-based compound thereon, resulting in higher production cost. There is also a demand for a more superior pigment dispersing ability.

DISCLOSURE OF THE INVENTION

An object of the present invention is to provide a dispersant for pigments for aromatic polymers which excels not only in the ability of dispersing the pigment in the aromatic polymer but also in the preservation of transparency and color stability of the resulting blended polymer compound and which can be produced by simple procedures at a low cost.

The dispersant for pigments for aromatic polymers according to the present invention comprises a wax composed of a random copolymer of ethylene and an aromatic vinyl compound, which has a content of structural unit derived from ethylene of 99–10% by weight and a content of structural unit derived from the aromatic vinyl compound of 1–90% by weight and exhibits an intrinsic viscosity of 0.04–0.6 dl/g.

The dispersant for pigments for aromatic polymers according to the present invention comprises, as an essential component, a wax of ethylene/aromatic vinyl compound copolymer. This wax is composed of a random copolymer of ethylene with an aromatic vinyl compound having a content of structural unit derived from ethylene (in the following, referred to sometimes as "content of ethylene") of 99–10% by weight, preferably 96–40% by weight, and a content of structural unit derived from the aromatic vinyl compound (in the following, referred to sometimes as "content of the aromatic vinyl compound") of 1–90% by weight, preferbly 4–60% by weight, and exhibiting an intrinsic viscosity determined in decahydronaphthalene at 135° C. of 0.04–0.6 dl/g, preferably 0.1–0.4 dl/g.

In the context of this specification, the word "wax" refers to a low molecular weight polymer having a weight-average molecular weight (Mw) in the order of 1,000 to 20,000.

For the aromatic vinyl compound, there may be exemplified styrene; mono- and polyalkylstyrenes, such as, methylstyrene, dimethylstyrene and ethylstyrene; functional group-containing derivatives of styrene, such as, methoxystyrene, ethoxystyrene, vinyl benzoate, methyl vinyl benzoate, vinyl benzyl acetate, hydroxystyrene, chlorostyrene and divinylbenzene; and others including 3-phenylpropylene and 4-phenylbutene. Among these, styrene is preferred. The aromatic vinyl compound can be employed alone or in a combination of two or more thereof.

The ethylene/aromatic vinyl compound copolymer wax may further comprise, copolymerized therein, in addition to ethylene and the aromatic vinyl compound, other comonomers each having 3–20 carbon atoms, such as α-olefin(s), cycloolefin(s), polar group-containing comonomer(s) and non-conjugated polyene(s), in an amount not obstructing the purpose of the present invention.

For the above-mentioned α-olefin, there may be enumerated, for example, ethylene, propylene, 1-butene, 1-pentene, 4-methyl-1-pentene, 1-hexene, 1-octene and 1-decene. As the above-mentioned cycloolefin, there may be enumerated, for example, cyclobutene, cyclopentene, cyclohexene and cyclooctene. As the polar group-containing comonomer, there may be enumerated, for example, vinyl acetate, acrylic acid, acrylates, methacrylic acid, methacrylates, maleic acid and maleic anhydride. As the above-mentioned non-conjugated polyene, there may be enumerated, for example, dicyclopentadiene, 1,4-hexadiene, cyclooctadiene, methylenenorbornene and ethylidenenorbornene.

While there is no special restriction as to how the wax composed of ethylene/aromatic vinyl compound copolymer is produced, preference is given for a wax of ethylene/aromatic vinyl compound copolymer produced using a metallocene catalyst (A), since this is particularly excellent in the ability for dispersing pigments.

For producing the ethylene/aromatic vinyl compound copolymer wax using a metallocene catalyst (A), there may be employed, for example, a method in which ethylene is co-polymerized with an aromatic vinyl compound in the presence of a metallocene catalyst (A) and a method in which a copolymer resulting from copolymerization of ethylene with an aromatic vinyl compound in the presence of a metallocene catalyst (A) is subjected to a heat degradation.

On a practical use of the wax composed of an ethylene/aromatic vinyl compound copolymer as a dispersant for a pigment, such a wax can be used either alone or in a combination of two or more thereof.

Now, the description is directed to the metallocene catalyst (A) and to the manner of producing the ethylene/aromatic vinyl compound copolymer wax by copolymerizing ethylene with an aromatic vinyl compound using the metallocene catalyst (A).

As the metallocene catalyst (A), those based on metallocene used hitherto as single site catalyst and ones similar to them may be used without any restriction, wherein, however, special preference is given to catalysts composed of a metallocene of a transition metal (referred to as a transition metal compound) (B), an organic aluminum oxy-compound (C) and/or an ionizing ionic compound (D).

For the metallocene (B), those of transition metals selected from Group 4 of the periodic table of elements with 18 Groups (long form) according to the Revised IUPAC Inorganic Nomenclature (1989) and, concretely, those expressed by the following formula (1)

$$ML_x \qquad (1)$$

may be enumerated, in which M denotes a transition metal selected from the Group 4 elements of the periodic table, namely, zirconium, titanium or hafnium, x is the valence of the transition metal and L represents a ligand coordinating to the transition metal, wherein at least one of the ligands has a cyclopentadienyl skeleton. This ligand L having the cyclopentadienyl skeleton may have one or more substituent groups.

Concrete examples of the ligand having the cyclopentadienyl skeleton include such groups as cyclopentadienyl; alkyl- and cycloalkyl-substituted cyclopentadienyls, such as, methylcyclopentadienyl, ethylcyclopentadienyl, n- and i-propylcyclopentadienyls, n-, i-, sec- and tert-butylcyclopentadienyls, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; and others, such as indenyl, 4,5,6,7-tetrahydroindenyl and fluorenyl.

These ligand groups may further be substituted by, for example, halogen atom(s) and trialkylsilyl group(s).

Among them, alkyl-substituted cyclopentadienyls are especially preferred.

In case where the metallocene (B) represented by the formula (1) has two or more ligand groups L having the cyclopentadienyl skeleton, two of these ligand groups having the cyclopentadienyl skeleton may be bound together through a bridging group, for example, an alkylene, such as ethylene or propylene; a substituted alkylene, such as isopropylidene or diphenylmethylene; silylene or a substituted silylene, such as dimethylsilylene, diphenylsilylene or methylphenylsilylene.

For other ligand group L than those having the cyclopentadienyl skeleton, there may be enumerated, for example, hydrocarbon groups, alkoxy groups, aryloxy groups and sulfo-containing groups (—SO$_3$R$^1$, in which R$^1$ denotes an alkyl, a halogen-substituted alkyl, an aryl or a halogen- or alkyl-substituted aryl) each having 1–12 carbon atoms, as well as halogen atoms and hydrogen atom.

As the hydrocarbon groups having 1–12 carbon atoms, there may be enumerated such groups as alkyl, cycloalkyl, aryl and aralkyl and, more concretely, alkyl groups, such as methyl, ethyl, n-propyl, isopropyl, n-butyl, isobutyl, sec-butyl, tert-butyl, pentyl, hexyl, octyl, decyl and dodecyl; cycloalkyl groups, such as cyclopentyl and cyclohexyl; aryl groups, such as phenyl and tolyl; and aralkyl groups, such as benzyl and neophyl.

As the alkoxy groups, there may be enumerated, for example, methoxy, ethoxy, n-propoxy, isopropoxy, n-butoxy, isobutoxy, sec-butoxy, tert-butoxy, pentoxy, hexoxy and octoxy.

As the aryloxy groups, for example, phenoxy may be enumerated.

As the sulfo-containing groups (—SO$_3$R$^1$), there may be enumerated, for example, methanesulfonato, p-toluenesulfonato, trifluoromethanesulfonato and p-chlorobenzenesulfonato.

As the halogen atoms, fluorine, chlorine, bromine and iodine are exemplified.

When the transition metal of the metallocene (B) represented by the formula (1) has a valency of 4, it may be represented more concretely by the formula (2):

$$R^2{}_k R^3{}_l R^4{}_m R^5{}_n M \qquad (2)$$

in which M is a transition metal same as that given in the formula (1), preferably zirconium or titanium, R$^2$ represents a group (ligand) having a cyclopentadienyl skeleton, R$^3$, R$^4$ and R$^5$ represent each, independently of each other, a group having a cyclopentadienyl skeleton or that which is given in the formula (1) as the ligand L other than that having a cyclopentadienyl skeleton and k is an integer of 1 or higher, wherein k+l+m+n=4.

Examples of the metallocene (B) which contains at least two ligands having each a cyclopentadienyl skeleton and in which M is zirconium are given below:

Bis(cyclopentadienyl)zirconium monochloride monohydride,
bis(cyclopentadienyl)zirconium dichloride,
bis(cyclopentadienyl)methylzirconium monochloride,
bis(cyclopentadienyl)zirconium phenoxymonochloride,
bis(methylcyclopentadienyl)zirconium dichloride,
bis(ethylcyclopentadienyl)zirconium dichloride,
bis(n-propylcyclopentadienyl)zirconium dichloride,
bis(isopropylcyclopentadienyl)zirconium dichloride,
bis(cyclopentadienyl)zirconium bis(methanesulfonate),
bis(cyclopentadienyl)zirconium bis(p-toluenesulfonate),
bis(1,3-dimethylcyclopentadienyl)zirconium dichloride,
bis(1-methyl-3-ethylcyclopentadienyl)zirconium dichloride and
bis(1-methyl-3-propylcyclopentadienyl)zirconium dichloride.

According to the present invention, it is also possible to use a metallocene (B) in which the 1,3-substituted cyclopentadienyl as given above is replaced by a corresponding 1,2-substituted cyclopentadienyl.

There may also be exemplified metallocenes of bridged structure in which at least two of the ligands R$^2$, R$^3$, R$^4$ and R$^5$ in the formula (2), for example, R$^2$ and R$^3$, are the group having a cyclopentadienyl skeleton and such at least two groups are bound each other through a bridging group, such as alkylene, substituted alkylene, silylene or substituted silylene. Here, the groups R$^4$ and R$^5$ stand, independently of each other, for the ligand L other than that having a cyclopentadienyl skeleton as explained for the general formula (1).

As the metallocene (B) of such a bridged structure, there may be enumerated, for example, ethylenebis(indenyl) dimethylzirconium, ethylenebis(indenyl)zirconium dichloride, ethylenebis(indenyl)zirconium-bis (trifluoromethane sulfonate) and isopropylidenebis(indenyl) zirconium dichloride.

According to the present invention, it is favorable to use as the bridged type metallocene (B) a metallocene represented by the formula (3):

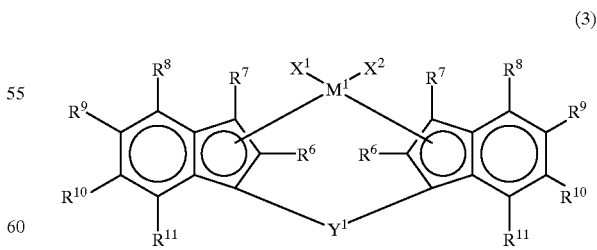

(3)

In the formula (3), M$^1$ represents a transition metal of Group 4, 5 or 6 of the periodic table and is concretely titanium, zirconium or hafnium.

R$^6$ and R$^7$ represent each, independently of each other, hydrogen atom, a halogen atom, a hydrocarbon group having 1–20 carbon atoms, a halogenated hydrocarbon group having 1–20 carbon atoms, a silicium-containing group, an oxygen-containing group, a sulfur-containing group, a nitrogen-containing group or a phosphorus-containing group. They represent concretely a halogen atom, such as fluorine, chlorine, bromine or iodine; a hydrocarbon group having 1–20 carbon atoms, for example, an alkyl group, such as methyl, ethyl, propyl, butyl, hexyl or cyclohexyl; an alkenyl group, such as vinyl, propenyl or cyclohexenyl; an aralkyl group, such as benzyl, phenylethyl or phenylpropyl; or an aryl group, such as phenyl, tolyl, dimethylphenyl, naphthyl or methylnaphthyl; a halogenated hydrocarbon group in which the hydrocarbon group such as given above is substituted by halogen atom(s); a silicium-containing group, for example, hydrocarbon-monosubstituted silyl group, such as methylsilyl or phenylsilyl, a hydrocarbon-disubstituted silyl, such as dimethylsilyl or diphenyl-silyl, a hydrocarbon-trisubstituted silyl, such as trimethylsilyl or triethylsilyl, a silyl ether of a hydrocarbon-substituted silyl, such as trimethylsilyl ether, a silicium-substituted alkyl, such as trimethylsilylmethyl, or a silicium-substituted aryl, such as trimethylsilylphenyl; an oxygen-containing group, for example, hydroxy, alkoxy, such as methoxy or ethoxy, aryloxy such as phenoxy or methylphenoxy, or arylalkoxy, such as phenylmethoxy or phenylethoxy; a sulfur-containing group in which the oxygen in the above oxygen-containing group is replaced by sulfur; a nitrogen-containing group, for example, amino, alkylamino, such as methylamino or dimethylamino, or an aryl- or alkylarylamino, such as phenylamino or methylphenylamino; or a phosphorus-containing group, such as dimethylphosphino.

Among them, for $R^6$, a hydrocarbon group, in particular, a hydrocarbon group having 1–3 carbon atoms, such as methyl, ethyl or propyl, is preferred. For $R^7$, preferred is hydrogen atom or a hydrocarbon group and, in particular, hydrogen atom or a hydrocarbon group having 1–3 carbon atoms, such as methyl, ethyl or propyl is preferable.

$R^8$, $R^9$, $R^{10}$ and $R^{11}$ stand each, independently of each other, for hydrogen atom, a halogen atom, a hydrocarbon group having 1–20 carbon atoms or a halogenated hydrocarbon group having 1–20 carbon atoms. Among them, hydrogen atom, a hydrocarbon and a halogenated hydrocarbon are preferred. Among the pairs of $R^8$ with $R^9$, $R^9$ with $R^{10}$ and $R^{10}$ with $R^{11}$, at least one pair may combine together to build up a monocyclic aromatic ring together with the carbon atoms bound to such a pair.

If two or more hydrocarbon radicals or halogenated hydrocarbon rasicals are present in the groups other than that building up an aromatic ring, they may combine together to form a ring. In case where $R^{11}$ is a substituent group other than an aromatic group, it may represent preferably hydrogen atom.

For the halogen atom, for the hydrocarbon group having 1–20 carbon atoms and for the halogenated hydrocarbon group having 1–20 carbon atoms, there may be enumerated concretely those which are given for $R^6$ and $R^7$.

$X^1$ and $X^2$ in the formula (3) represent each, independently of each other, hydrogen atom, a halogen atom, a hydrocarbon group having 1–20 carbon atoms, a halogenated hydrocarbon group having 1–20 carbon atoms, an oxygen-containing group or a sulfur-containing group.

For the halogen atom, for the hydrocarbon group having 1–20 carbon atoms, for the halogenated hydrocarbon group having 1–20 carbon atoms and for the oxygen-containing group, concretely, those which are given for $R^6$ and $R^7$ may be exemplified.

For the sulfur-containing group, there may be exemplified sulfonates, such as methyl sulfonate, trifluoromethane sulfonate, phenyl sulfonate, benzyl sulfonate, p-toluene sulfonate, trimethylbenzene sulfonate, triisobutylbenzene sulfonate, p-chlorobenzene sulfonate and pentafluorobenzene sulfonate; and sulfinates, such as methyl sulfinate, phenyl sulfinate, benzene sulfinate, p-toluene sulfinate, trimethylbenzene sulfinate and pentafluorobenzene sulfinate, in addition to those which are given for $R^6$ and $R^7$.

$Y^1$ stands for a divalent hydrocarbon radical having 1–20 carbon atoms, a divalent halogenated hydrocarbon radical having 1–20 carbon atoms, a divalent silicium-containing radical, a divalent germanium-containing radical, a divalent tin-containing radical, —O—, —CO—, —S—, —SO—, —SO$_2$—, —NR$^{12}$—, —P(R$^{12}$)—, —P(O)(R$^{12}$)—, —BR$^{12}$— or —AlR$^{12}$—, wherein $R^{12}$ represents hydrogen, a halogen atom, a hydrocarbon group having 1–20 carbon atoms or a halogeneted hydrocarbon group having 1–20 carbon atoms.

Concrete examples of $Y^1$ include divalent hydrocarbon groups having 1–20 carbon atoms, for example, alkylenes, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; arylalkylenes, such as diphenylmethylene and diphenyl-1,2-ethylene; halogenated hydrocarbon groups corresponding to halogenated ones of the above divalent hydrocarbon groups having 1–20 carbon atoms, such as chloromethylene; divalent silicium-containing radicals, for example, alkyl silylenes, alkylarylsilylenes and arylsilylenes, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene, and alkyldisilylenes, alkylaryldisilylenes and aryldisilylenes, such as tetramethyl-1,2-disilylene and tetraphenyl-1,2-disilylene; divalent germanium-containing radicals corresponding to those in which silicon atom is replaced by germanium atom in the above divalent silicium-containing radicals; and divalent tin-containing radicals corresponding to those in which silicium atom is replaced by tin atom in the above divalent silicium-containing radicals.

For the group $R^{12}$, a halogen atom, a hydrocarbon group having 1–20 carbon atoms and a halogenated hydrocarbon group having 1–20 carbon atoms, as given for the group $R^6$ or $R^7$, may be exemplified.

Among them, divalent silicium-containing radicals, divalent germanium-containing radicals and divalent tin-containing radicals are preferred, wherein special preference is given to divalent silicium-containing radicals, in particular, to alkylsilylenes, alkylarylsilylenes and arylsilylenes.

Concrete examples of the metallocene (B) represented by the formula (3) are recited below:

rac-ethylene-bis(2-methyl-1-indenyl)zirconium dichloride,
rac-dimethylmethylene-bis(indenyl)zirconium dichloride,
rac-dimethylmethylene-bis(2-methyl-1-indenyl)zirconium dichloride,
rac-diphenylmethylene-bis(2-methyl-1-indenyl)zirconium dichloride,
rac-dimethylsilylene-bis(2-methyl-1-indenyl)zirconium dichloride,
rac-dimethylsilylene-bis(2-methyl-1-indenyl)zirconium-dimethyl,
rac-dimethylsilylene-bis(4,7-dimethyl-1-indenyl)zirconium dichloride,
rac-dimethylsilylene-bis(2,4,7-trimethyl-1-indenyl)zirconium dichloride, rac-dimethylsilylene-bis(2,4,6-trimethyl-1-indenyl) zirconium dichloride,
rac-dimethylsilylene-bis(4-phenyl-1-indenyl)zirconium dichloride,
rac-dimethylsilylene-bis(2-methyl-4-phenyl-1-indenyl) zirconium dichloride,
rac-dimethylsilylene-bis{2-methyl-4-(α-naphthyl)-1-indenyl}zirconium dichloride,
rac-dimethylsilylene-bis{2-methyl-4-(β-naphthyl)-1-indenyl}zirconium dichloride and
rac-dimethylsilylene-bis{2-methyl-4-(1-anthracenyl)-1-indenyl}zirconium dichloride.

According to the present invention, it is also possible to use metallocenes represented by the formula (4) given below, as the metallocene (B).

$$L^1 M^2 Z_2 \qquad (4)$$

in which $M^2$ is a metal of Group 4 or of the lanthanide series of the periodic table, $L^1$ denotes a derivative of non-localized π-bonding group, which provides the active site of the metal $M^2$ with a captive geometry, and the two Zs represent each, independently of each other, hydrogen atom, a halogen atom, a hydrocarbon group having 20 or less carbon atoms, a silyl group having 20 or less silicon atoms or a germyl group having 20 or less germanium atoms.

Among these metallocenes (B) represented by the formula (4), preference is given to those expressed by the following formula (5):

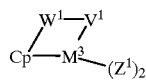
(5)

in which $M^3$ is titanium, zirconium or hafnium, $Z^1$ has the same meaning as Z of the formula (4) given above, Cp denotes a cyclopentadienyl group, a substituted cyclopentadienyl group or a derivative of these groups, which is bound to $M^3$ by π-bonding in a $\eta^5$-binding form, $W^1$ represents oxygen atom, sulfur atom, boron atom or an element of Group 14 of the periodic table or a radical containing such an element and $V^1$ is a ligand containing nitrogen, phosphorus, oxygen or sulfur. It is permissible that a condensed ring may be formed from $W^1$ and $V^1$ or from Cp and $W^1$.

Preferred examples of the group represented by Cp in the general formula (5) include cyclopentadienyl, indenyl, fluorenyl and saturated derivatives of them. They form a ring together with the metal ($M^3$). Each carbon atom in the cyclopentadienyl group may be substituted by one and the same or a different radical selected from the group consisting of halogen radicals, hydrocarbyl radicals, substituted hydrocarbyl radicals in which one or more hydrogen atoms may be replaced by a halogen atom and hydrocarbyl-substituted matalloid radicals, wherein the metalloid is selected from the elements of Group 14 of the periodic table. Here, one or more of the substituent groups may build up together a fused ring. A preferred hydrocarbyl or substituted hydrocarbyl group which can substitute for at least one hydrogen atom in the cyclopentadienyl group has 1–20 carbon atoms and includes one or more linear or branched chain alkyl groups, one or more cyclic hydrocarbon groups, one or more alkyl-substituted cyclic hydrocarbon groups, one or more aromatic groups and alkyl-substituted aromatic groups. Preferable organometalloid groups contain one or more mono-, di- and trisubstituted organometalloid groups of elements of Group 14 of the periodic table and each of the hydrocarbyl groups has 1–20 carbon atoms. Concrete examples of preferable organometalloid group include trimethylsilyl, triethylsilyl, ethyldimethylsilyl, methyldiethylsilyl, phenyldimethylsilyl, methyldiphenylsilyl, triphenylsilyl, triphenylgermyl and trimethylgermyl.

Concrete examples of the group $Z^1$ in the formula (5) include hydrido, halo, alkyl, silyl, germyl, aryl, amido, aryloxy, alkoxy, phosphido, sulfido, acyl, pseudohalides, such as cyanido and azido, and acethylacetonato as well as combinations of them wherein such combinations may be composed of identical and/or different groups.

For the metallocenes (B) represented by the formula (5), especially those represented by the following general formula (6) are preferred:

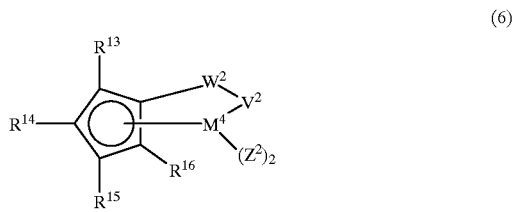
(6)

In the formula (6), $M^4$ has the same meaning as $M^3$ in the formula (5), $V^2$ may stand either for the group —O—, —S—, —NR$^{17}$— or —PR$^{17}$— or for a neutral ligand of a two-electron doner selected from the group consisting of OR$^{17}$, SR$^{17}$, N(R$^{17}$)$_2$ and P(R$^{17}$)$_2$, wherein R$^{17}$ denotes hydrogen atom, an alkyl, aryl, silyl, halogenated alkyl or halogenated aryl having 20 or less atoms of the elements other than hydrogen, or, further, may form a condensed ring together with another R$^{17}$ or with R$^{18}$ referred to afterwards.

In the formula (6), $W^2$ stands for Si(R$^{18}$)$_2$, C(R$^{18}$)$_2$, Si(R$^{18}$)$_2$Si(R$^{18}$)$_2$, C(R$^{18}$)$_2$C(R$^{18}$)$_2$, CR$^{18}$=CR$^{18}$, C(R$^{18}$)$_2$Si (R$^{18}$)$_2$, Ge(R$^{18}$)$_2$, BR$^{18}$ or B(R$^{18}$)$_2$, wherein R$^{18}$ has the same meaning as R$^{17}$ given above.

In the formula (6), R$^{13}$–R$^{16}$ may stand each, independently of each other, for hydrogen atom or for a radical of alkyl, aryl, silyl, germyl, cyano or halo, which has 20 or less atoms other than hydrogen, or a combination of such radicals, such as alkaryl, aralkyl, silyl-substituted alkyl, silyl-substituted aryl, cyanoalkyl, cyanoaryl, haloalkyl or halosilyl, wherein it is possible that one or more pairs of adjoining groups of R$^{13}$–R$^{16}$ may form a hydrocarbyl ring condensed with the cyclopentadienyl moiety.

$Z^2$ in the formula (6) may represent a hydrido or may stand for a radical selected from the group consisting of halo and radicals of alkyl, arylsilyl, germyl, aryloxy, alkoxy, amido and silyloxy, each having 20 or less atoms of the elements other than hydrogen, as well as combinations of them (for example, alkaryl, aralkyl, silyl, substituted alkyl, silyl-substituted aryl, aryloxyalkyl, aryloxyaryl, alkoxyalkyl, alkoxyaryl, amidoalkyl, amidoaryl, siloxyalkyl, siloxyaryl, amidosiloxyalkyl, haloalkyl and haloaryl) and neutral Lewis bases having up to 20 atoms of elements other than hydrogen.

When $V^2$ in the metallocene (B) represented by the formula (6) is a neutral two-electron-donating ligand, the bonding between $M^4$ and $V^2$ is constituted of so-called coordinate-covalent bond. Here, the complex can exist as a dimer or a higher oligomer.

In the metallocene (B) represented by the formula (6), it is preferable that at least one among R$^{13}$–R$^{16}$, Z$^2$, R$^{17}$ and R$^{18}$ constitutes an electron donating moiety and, in particular, that $V^2$ is an amido or a phosphido corresponding to —NR$^{19}$— or —PR$^{19}$— wherein R$^{19}$ represents an alkyl having 1–10 carbon atoms or an aryl having 6–10 carbon atoms.

Among the metallocenes (B) represented by the formula (6), those amidosilane and amidoalkanediyl compounds which are represented by the following formula (7) are preferred:

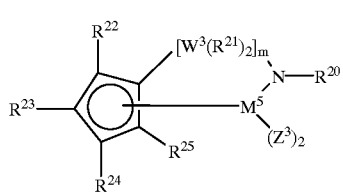

(7)

In the formula (7), M$^5$ is titanium, zirconium or hafnium bound to the cyclopentadienyl group by a $\eta^5$ bonding, R$^{20}$–R$^{25}$ represent each, independently of each other, a radical selected from the group consisting of hydrogen atom and radicals of silyl, alkyl and aryl each having up to 10 carbon atoms as well as combinations of them or adjoining pair(s) among R$^{22}$–R$^{25}$ may form a hydrocarbyl ring condensed with the cyclopentadienyl moiety, W$^3$ stands for silicium atom or carbon atom, Z$^3$ represents hydrido or stands, in each case, for a halo or an alkyl, aryl, aryloxy or alkoxy each having up to 10 carbon atoms.

For the metallocenes (B) represented by the formula (7), those in which R$^{20}$ stands for methyl, ethyl, propyl, butyl, pentyl, hexyl (inclusive of isomers), norbornyl, benzyl or phenyl, R$^{22}$–R$^{25}$ denote each, independently of each other, hydrogen atom, methyl, ethyl, propyl, butyl, pentyl, hexyl (inclisive of isomers), norbornyl or benzyl and Z$^3$ denotes chloro, bromo, iodo, methyl, ethyl, propyl, butyl, pentyl, hexyl (inclusive of isomers), norbornyl, benzyl or phenyl are preferred. Also, metallocenes in which groups among R$^{22}$–R$^{25}$ form a condensed ring and in which the cyclopentadienyl moiety constitutes indenyl, tetrahydroindenyl, fluorenyl or octahydrofluorenyl ring are preferred.

Concrete examples of the metallocenes (b) represented by the formula (7) include (t-butylamido)dimethyl(tetramethyl-$\eta^5$-cyclopentadienyl)silanetitanium dichloride, (t-butylamido)tetramethyl-$\eta^5$-cyclopentadienyl)-1,2-ethanediylzirconium dichloride, (t-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido)(tetramethyl-$\eta^5$-cyclopentadienyl)-1,2-ethanediyltitanium dichloride, (ethylamido)(tetramethyl-$\eta^5$-cyclopentadienyl)methylenetitanium dichloride, (t-butylamido)dimethyl (tetramethyl-$\eta^5$-cyclopentadienyl)silanezirconium dibenzyl, (benzylamido)dimethyl (tetramethyl-$\eta^5$-cyclopentadienyl)silanetitanium dichloride and (phenylphosphido) dimethyl(tetramethyl-$\eta^5$-cyclopentadienyl)silanezirconium dibenzyl.

According to the present invention, the followings may also be used for the metallocene (B):

Ethylene[2-methyl-4(9-phenanthryl)-1-indenyl](9-fluorenyl)zirconium dichloride

Ethylene[2-methyl-4(9-phenanthryl)-1-indenyl](2,7-dimethyl-9-fluorenyl)zirconium dichloride Ethylene[2-methyl-4(9-phenanthryl)-1-indenyl](2,7-di-tert-butyl-9-fluorenyl)zirconium dichloride Ethylene(2-methyl-4,5-benzo-1-indenyl)(9-fluorenyl)zirconium dichloride Ethylene(2-methyl-4,5-benzo-1-indenyl)(2,7-dimethyl-9-fluorenyl)zirconium dichloride Ethylene(2-methyl-4,5-benzo-1-indenyl)(2,7-di-tert-butyl-9-fluorenyl)zirconium dichloride Ethylene(2-methyl-$\alpha$-acenaphtho-1-indenyl)(9-fluorenyl)zirconium dichloride Ethylene(2-methyl-$\alpha$-acenaphtho-1-indenyl)(2,7-dimethyl-9-fluorenyl)zirconium dichloride Ethylene(2-methyl-$\alpha$-acenaphtho-1-indenyl)(2,7-di-t-butyl-9-fluorenyl)zirconium dichloride Dimethylsilylene[2-methyl-4(9-phenanthryl)-1-indenyl](9-fluorenyl)zirconium dichloride As others, those in which zirconium in the above-exemplified zirconium metallocenes is replaced by titanium or by hafnium may also be exemplified.

As to the method for preparing the metallocenes (B), reference may be made to, for example, Japanese Patent Kokai Hei-3-163088 A (corresponding to European Patent No. 416815 A$_2$/1991).

For the metallocene (B) to be used according to the present invention, those represented by the formula (4) are preferred particularly in view of the polymerization activity and the ability for dispersing pigments. The metallocenes (B) described above may be used alone or in a combination of two or more of them.

The metallocenes (B) to be used according to the present invention may be diluted with a hydrocarbon or halogenated hydrocarbon diluent upon its use.

Now, the description is directed to the organic aluminum oxy-compound (C) and to the ionizing ionic compound (D) to be used for preparing the metallocene catalyst (A).

As the organic aluminum oxy-compound (C) to be used according to the present invention, known aluminoxanes and those benzene-insoluble organic aluminum oxy-compounds which are exemplified in Japanese Patent Kokai Hei-2-78687 A (corresponding to U.S. Pat. No. 4,990,640) may be used.

These known aluminoxanes (C) are represented by the following general formulae (8) and (9):

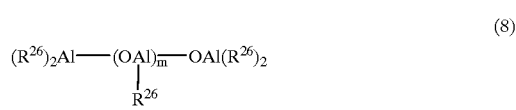

(8)

(9)

In the above formulae (8) and (9), R$^{26}$ is a hydrocarbon group, such as methyl, ethyl, propyl or butyl, wherein preference is given for methyl and ethyl, especially for methyl, and m is an integer of 2 or greater, preferably of 5–40.

Here, it is also possible that the aluminoxane (C) be composed of mixed alkyloxyaluminum units composed of an alkyloxyaluminum unit represented by the formula [OAl(R$^{27}$)] and of an alkyloxyaluminum unit represented by the formula [OAl(R$^{28}$)], wherein R$^{27}$ and R$^{28}$ may be exemplified by a hydrocarbon group such as those given for R$^{26}$, wherein R$^{27}$ and R$^{28}$ stand for different groups.

The aluminoxane (C) can be prepared, for example, by the methods given below and is obtained usually in a form of a solution in a hydrocarbon solvent:

(1) To a suspension of a salt containing adsorbed moisture or water of cristallization, such as hydrated salt of magnesium chloride, copper sulfate, aluminum sulfate, nickel sulfate or cerous chloride, in an aromatic hydrocarbon solvent, an organoaluminum compound, such as trialkylaluminum, is added to cause reaction with water and recovering the reaction product as a solution in the solvent.

(2) An organoaluminum compound, such as trialkylaluminum, is reacted dierectly with water (liquid water, ice or steam) in a suitable aromatic hydrocarbon solvent, such as benzene, toluene, ethyl ether or tetrahydrofuran, to form a solution of the reaction product in the solvent, which is recovered.

(3) An organoaluminum compound, such as trialkylaluminum, is reacted with an organotin oxide, such as dimethyltin oxide or dibutyltin oxide, in a suitable hydrocarbon solvent, such as decane, benzene or toluene, to form a solution of the reaction product in the solvent, which is recovered.

As the solvent used in the preparation of the aluminoxane (C), there may be exemplified hydrocarbons, for example, aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; ethers, such as ethyl ether and tetrahydrofuran; petroleum cut fractions, such as gasoline, kerosene and gas oil; and halogenated hydrocarbons, such as halogenated products of the aromatic, aliphatic and alicyclic hydrocarbons given above, for example, chlorinated or brominated products. Among these solvents, especially aromatic hydrocarbons are preferred.

For the ionizing ionic compound (D), there may be exemplified Lewis acids, ionic compounds, boranes and carboranes. Such ionizing ionic compounds (D) are given in the literatures, for example, Japanese Patent Kohyo Hei-1-501950 (corresponding U.S. Pat. Nos. 5,198,401, 5,278,119, 5,384,299, 5,391,629, 5,407,884, 5,408,017, 5,470,927, 5,483,014, 5,599,761 and 5,621,126), Japanese Patent Kohyo Hei-1-502036 (corresponding U.S. Pat. Nos. 5,153, 157, 5,198,401, 5,241,025, 5,384,299, 5,391,629, 5,408,017, 5,470,927, 5,599,761 and 5,621,126), Japanese Patent Kokais Hei-3-179005 (corresponding U.S. Pat. No. 5,561, 092), Hei-3-179006 (corresponding U.S. Pat. No. 5,225, 500), Hei-3-207703 (corresponding U.S. Pat. No. 5,387, 568), Hei-3-207704 (corresponding U.S. Pat. Nos. 5,519, 100 and 5,614,457) and U.S. Pat. No. 5,321,106.

Examples of the Lewis acid to be used as the ionizing ionic compound (D) include compounds represented by the formula $BR_3$ (R may be identical with or different from each other and may stand for fluorine or a phenyl group which may have substituent group(s), such as fluorine, methyl and trifluorophenyl), for example, trifluoroboron, triphenylboron, tris(4-fluorophenyl)boron, tris(3,5-difluorophenyl)boron, tris(4-fluoromethylphenyl)boron and tris(pentafluorophenyl)boron.

The ionic compound to be uaed as the ionizing ionic compound (D) may be a salt composed of a cationic component and an anionic component. The anion functions to react with the metallocene (B) to cationize the metallocene (B) to thereby stabilize the transition metal cation of the metallocene (B) by forming an ion pair. For such an anion, anions of organoboron, organoarsene and organoaluminum are enumerated, wherein an anion of relatively bulky geometry permitting stabilization of transition metal cation is preferred. For the cation, matal cations, organometallic cations, carbonium cations, oxonium cations, sulfonium cations, phosphonium cations and ammonium cations are enumerated. More specifically, triphenylcarbenium cation, tributylammonium cation, N,N-dimethylammonium cation and ferrocenium cations are preferred.

Among them, ionic compounds having boron-containing moiety as anion are preferred. Concretely, trialkyl-substituted ammonium salts, N,N-dialkyl-anilinium salts, dialkylammonium salts and triarylphosphonium salts are exemplified for the ionic compound.

As the trialkyl-substituted ammonium salt, there may be enumerated, for example, triethylammonium tetra(phenyl) borate, tripropylammonium tetra(phenyl)borate, tri(n-butyl) ammonium tetra(phenyl)borate and trimethylammonium tetra(p-tolyl)borate.

As the N,N-dialkylanilinium salt, there may be enumerated, for example, N,N-dimethylanilinium tetra (phenyl)borate.

As the dialkylammonium salt, there may be enumerated, for example, di(n-propyl)ammonium tetra (pentafluorophenyl)barate and dicyclohexylammonium tetra (phenyl)borate.

As the triarylphosphonium salt, there may be enumerated, for example, triphenylphosphonium tetra(phenyl)borate, tri (methylphenyl)phosphonium tetra(phenyl)borate and tri (dimethylphenyl)phosphonium tetra(phenyl)borate.

As the ionic compound, there may further be enumerated triphenylcarbenium tetrakis(pentafluorophenyl)borate, N,N-dimethylanilinium tetrakis(pentafluorophenyl)borate and ferrocenium tetra(pentafluorophenyl)borate.

As the borane compound to be used as the ionizing ionic compound (D), the following compounds may also be enumerated:

Decaborane(14)

Salts of such anion as bis[tri(n-butyl)ammonium] nonaborate and bis[tri(n-butyl)ammonium] decaborate Salts of metal borane anions, such as tri(n-butyl) ammonium bis(dodecahydridododecaborate)cobaltate (III) and bis[tri(n-butyl)ammonium] bis (dodecahydridododecaborate)nickelate(III).

As the carboranes to be used as the ionizing ionic compound (D), there may be enumerated, for example, salts of such anions as 4-carbnonaborane(14) and 1,3-dicarbnonaborane(13); and salts of metal carborane anions, such as tri(n-butyl)ammonium bis(nonahydrido-1,3-dicarbnonaborate)cobaltate(III) and tri(n-butyl)ammonium bis(undecahydrido-7,8-dicarbundecaborate) ferrate(III).

These ionizing ionic compounds (D) may be used alone or in a combination of two or more of them.

The metallocene catalyst (A) to be used according to the present invention may contain, on requirement, in addition to the components mentioned above, a further component (E) of an organoaluminum compound given below.

As the organoaluminum compound (E) to be used on requirement according to the present invention, for example, the organoaluminum compounds represented by the following formula (10) may be enumerated.

$$(R^{29})_n AlX_{3-n} \qquad (10)$$

in which $R^{29}$ is a hydrocarbon group having 1–15 carbon atoms, preferably 1–4 carbon atoms, X denotes a halogen atom or hydrogen atom and n is an integer of 1–3.

The hydrocarbon group having 1–15 carbon atoms may be, for example, alkyl, cycloalkyl or aryl and, concretely, methyl, ethyl, n-propyl, isopropyl or isobutyl.

Concrete examples of such an organoaluminum compound (E) include the followings:

Trialkylaluminums, such as trimethylaluminum, triethylaluminum, triisopropylaluminum, tri-n-butylaluminum, triisobutylaluminum and tri-sec-butylaluminum; alkenylaluminums, such as those represented by the general formula $(i-C_4H_9)_xAl_y(C_5H_{10})_z$, in which x, y and z denote each a positive integer wherein $z \geq 2x$, for example, isoprenylaluminum; dialkylaluminum halides, such as dimethylaluminum chloride and diisobutylaluminum chloride; dialkylaluminum hydrides, such as diisobutylaluminum hydride and so on; dialkylaluminum alkoxides, such as dimethylaluminum methoxide and so on; and dialkylaluminum aryloxides, such as diethylaluminum phenoxide and so on.

It is permissible to use, as the organoaluminum compound (E), also the compounds represented by the following formula (11):

$$(R^{31})_nAl(R^{30})_{3-n} \qquad (11)$$

in which $R^{31}$ has the same meaning as foregoing $R^{29}$, $R^{30}$ is a group of $-OR^{32}$, $-OSi(R^{33})_3$, $-OAl(R^{34})_2$, $-N(R^{35})_2$, $-Si(R^{36})_3$ or $-N(R^{37})Al(R^{38})_2$ and n is a number of 1–2, wherein $R^{32}$, $R^{33}$, $R^{34}$ and $R^{38}$ denote each methyl, ethyl, isopropyl, isobutyl, cyclohexyl or phenyl, $R^{35}$ denotes hydrogen atom, methyl, ethyl, isopropyl, phenyl or trimethylsilyl and $R^{36}$ and $R^{37}$ represent each methyl or ethyl.

The followings are concrete examples of such an organoaluminum compound (E):

$(C_2H_5)_2Al\{OSi(CH_3)_3\}$
$(iso\text{-}C_4H_9)_2Al\{OSi(CH_3)_3\}$
$(C_2H_5)_2Al\{OAl(C_2H_5)_2\}$
$(CH_3)_2Al\{N(C_2H_5)_2\}$
$(C_2H_5)_2Al\{NH(CH_3)\}$
$(iso\text{-}C_4H_9)_2Al\{N\{Si(CH_3)_3\}_2\}$ The metallocene catalyst (A) to be used according to the present invention may be a solid catalyst having at least one of the above-mentioned components (B), (C), (D) and (E) supported on a fine particulate carrier.

The metallocene catalyst (A) may also be a prepolymer-catalyst composed of a fine particulate carrier, the component (B), the component (C) {or the component (D)} and a polymer or a copolymer produced by a preliminary polymerization, with, if necessary, possible incorporation of the component (E).

The fine particulate carrier to be used in the solid catalyst or in the prepolymer-catalyst may be a granular or a fine particulate solid of an organic or inorganic compound having a particle size of 10–300 μm, preferably 20–200 μm.

For the inorganic carrier, porous oxides are preferred, of which concrete examples include $SiO_2$, $Al_2O_3$, $MgO$, $ZrO_2$, $TiO_2$, $B_2O_3$, $CaO$, $ZnO$, $BaO$ and $ThO_2$ as well as mixtures of them, such as $SiO_2/MgO$, $SiO_2/Al_2O_3$, $SiO_2/TiO_2$, $SiO_2/V_2O_5$, $SiO_2/Cr_2O_3$ and $SiO_2/TiO_2/MgO$. Among them, those in which at least one selected from the group consisting of $SiO_2$ and $Al_2O_3$ is the principal constituent are preferred.

The inorganic carrier may contain a small amount of one or more of carbonate, sulfate, nitrate or other oxide, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

While the properties of the fine particulate carrier may be variable for each specific carrier and in accordance with the method of preparation thereof, those which have a specific surface area of 50–1,000 m²/g, preferably 100–700 m²/g and a pore volume of 0.3–2.5 cm³/g are preferred. The fine particulate carrier may, if necessary, be calcined at a temperature of 100–1,000° C., preferably 150–700° C. for practical use.

For the fine particulate carrier, there may further be enumerated granular or fine particulate solid materials of organic compounds having particle sizes in the range of 10–300 μm. Such organic fine particulate carriers may be, for example, homo- and copolymer resins constituted mainly of an α-olefin having 2–14 carbon atoms, such as ethylene, propylene, 1-butene or 4-methyl-1-pentene, and homo- and copolymer resins constituted mainly of vinylcyclohexane or styrene.

For producing the ethylene/aromatic vinyl compound copolymer wax using the metallocene catalyst (A), ethylene and an aromatic vinyl compound are subjected to copolymerization usually by a solution polymerization or a slurry polymerization in a liquid medium in the presence of the metallocene catalyst (A).

For such a hydrocarbon solvent, for example, aliphatic hydrocarbons, such as pentane, hexane, heptane, octane, decane, dodecane and kerosene, as well as their halogenated derivatives; alicyclic hydrocarbons, such as cyclohexane, methylcyclopentane and methylcyclohexane, as well as their halogenated derivatives; and aromatic hydrocarbons and their halogenated derivatives, such as benzene, toluene, xylene, ethylbenzene and chlorobenzene, may be employed solely or in a combination.

It is also possible to co-polymerize ethylene and an aromatic vinyl compound in either a batch-wise technique or continuous technique. On performing the copolymerization in a continuous way, the metallocene catalyst (A) is employed in a concentration as follows:

Thus, the concentration of the metallocene (B) in the polymerization system may be in the range of 0.00005–0.1 mmol/liter of the polymerization volume, preferably 0.0001–0.05 mmol/liter. The organic aluminum oxy-compound (C) may be supplied to the polymerization system at such a rate as to reach an atomic ratio of aluminum to metallocene (B) [i.e. Al/transition metal] in the polymerization system within a range of 0.1–10,000, preferably 1–5,000. The ionizing ionic compound (D) may be supplied to the polymerization system at such a rate as to achieve a mole ratio of the ionizing ionic compound (D) to the metallocene (B) [i.e. moles of ionizing ionic compound (D)/moles of metallocene (B)] in the polymerization system within a range of 0.1–20, preferably 1–10.

The organoaluminum compound (E) may, when used, be supplied to the polymerization system usually in an amount of about 0–5 mmol/liter of the polymerization volume, preferably 0–2 mmol/liter.

The copolymerization for producing the ethylene/aromatic vinyl compound copolymer wax may be realized usually under the conditions of a temperature of −30 to +250° C., preferably 0 to +200° C., and a pressure exceeding the normal pressure and up to 7.8 MPa (80 Kg/cm², gauge), preferably up to 4.9 MPa (50 Kg/cm², gauge).

The polymerization duration (the average residence time in the polymerization reactor for continuous process) may usually be in the range from 5 minutes to three hours, preferably from 10 minutes to 1.5 hours, though variable depending on, for example, catalyst concentration and polymerization temperature.

The intrinsic viscosity and the molecular weight of the ethylene/aromatic vinyl compound copolymer wax can be adjusted by, for example, regulating the supply rate of hydrogen gas at a constant supply rate of ethylene.

In the production of the ethylene/aromatic vinyl compound copolymer wax, ethylene and the aromatic vinyl compound are supplied to the polymerization system each in such an amount that a copolymer having a specific composition as given above will be obtained.

By realizing the copolymerization by feeding ethylene and the aromatic vinyl compound and controlling the supply rate of hydrogen gas so as to adjust the molecular weight at 1,000–20,000 in a manner as given above, the ethylene/aromatic vinyl compound copolymer wax is obatined usually as the polymerization liquor containing it. The polymerization liquor is then subjected to a usual after-treatment to obtain the ethylene/aromatic vinyl compound copolymer wax.

For the technique for performing the heat degradation for obtaining the ethylene/aromatic vinyl compound copolymer wax, there may be exemplified a method in which a high molecular weight ethylene/aromatic vinyl compound copolymer resulting from a copolymerization of ethylene with an aromatic vinyl compound in the presence of a metallocene catalyst (A) is supplied to a monoaxial, biaxial or multiaxial extruder and is extruded therefrom under melt kneading, a method in which a high molecular weight ethylene/aromatic vinyl compound copolymer is supplied directly to a reactor of tubular or bulky form to subject to heating to effect the degradation and a method in which a high molecular weight ethylene/aromatic vinyl compound copolymer is supplied to an extruder and is extruded therefrom continuously under melt kneading into a tubular reactor to subject it to heating so as to effect the degradation. The temperature in the extruder or in the reactor may be 300–450° C., preferably 350–400° C. Among these methods, preference is given for the method in which the high molecular weight ethylene/aromatic vinyl compound copolymer is supplied to an extruder and is extruded therefrom continuously under melt kneading into a tubular reactor to subject it to heating so as to effect the degradation. The heat degradation may preferably be performed under an inert gas atmosphere, such as nitrogen or the like.

The high molecular weight ethylene/aromatic vinyl compound copolymer to be subjected to the heat degradation may be produced in the same manner as the production of the ethylene/aromatic vinyl compound copolymer wax using the metallocene catalyst (A). Here, however, a copolymer having higher intrinsic viscosity and higher molecular weight is produced by regulating the rate of hydrogen supply.

While the dispersant for pigments according to the present invention contains an ethylene/aromatic vinyl compound copolymer wax as an essential component, also other wax component(s) may appropriately be contained therein on requirement, wherein such other wax components comprise natural waxes selected from the group consisting of vegetable waxes, such as carnauba wax etc., animal waxes, such as beeswax and lanolin, and mineral waxes, such as montan wax etc., petroleum waxes, such as paraffin wax etc.; synthetic waxes, selected from the group consisting of synthetic hydrocarbon waxes, such as polyethylene wax derivatives, modified waxes, such as paraffin wax derivatives, hydrogenated waxes, such as hydrogenated castor oil etc., and fatty acid amide ester ketones; as well as composite waxes. The amount of such other wax components may usually be in the range of 1–200 parts by weight, preferably 1–100 parts by weight, per 100 parts by weight of the ethylene/aromatic vinyl compound copolymer wax.

The dispersant for pigments according to the present invention is used for dispersing pigments in aromatic polymers. Here, the aromatic polymers are exemplified concretely by polymers based on styrene having a structural unit of styrene-based compound, such as polystyrene, poly-α-methylstyrene, styrene/acrylonitrile copolymer (AS) and styrene/acrylonitrile/butadiene copolymer (ABS); polyesters; polycarbonates and polyphenylene ethers. Among these aromatic polymers, those based on styrene, especially polystyrene is preferred for being pigmented using the dispersant according to the present invention.

On dispersing pigments in the aromatic polymers, it is possible to use only the dispersant according to the present invention alone or to use it in combination with known dispersant for pigment.

The dispersant for pigment according to the present invention can be used for both organic and inorganic pigments known for coloring the polymers. Concrete examples of inorganic pigments include metals, such as aluminum, silver and gold; carbonates, such as calcium carbonate and barium carbonate; oxides, such as ZnO, $TiO_2$, $Al_2O_3.nH_2O$ and $Fe_2O_3.nH_2O$; sulfates, such as $CaSO_4$ and $BaSO_4$; nitrates, such as $Bi(OH)_2NO_3$; chlorides, such as $PbCl_2.Pb(OH)_2$; chromates, such as $CaCrO_4$ and $BaCrO_4$; chromites, such as $CoCr_2O_4$; manganates and permanganates; borates, such as $Cu(BO)_2$; uranates, such as $Na_2U_2O_7.6H_2O$; nitrites, such as $K_3CO(NO_2)_6.3H_2O$; silicates, such as $SiO_2$; arsenates and arsenites, such as $CuAsO_3.Cu(OH)_2$; acetates, such as $Cu(C_2H_3O_2)_2.Cu(OH)_2$; phosphates, such as $(NH_4)_2MnO_2(P_2O_7)_2$; salts, such as aluminates, molybdates, zincates, stannates, antimonates, wolframates, selenides, titanates, iron cyanide and phthalates; and sulfides, such as CaS, ZnS and CdS.

Concrete examples of organic pigments include natural organic pigments, such as cochineal lake and madder lake; nitroso pigments, such as Naphthol Green Y and Naphthol Green B; nitro pigments, such as Naphthol Yellow S and Pigment Chlorine 2G; azo pigments, such as Permanent Red 4R, Hanza Yellow, Brilliant Carmine 6B and Scarlet 2R; basic dye lakes, such as Malachite Green and Rhodamine B; acid dye lakes, such as Acid Green Lake and eosine lake; mordant dye lakes, such as alizarin lake and purpurin lake; vat dye pigments, such as Thioindigo red B and Indanthrene Orange; and phthalocynine pigments, such as Phthalocyanine Blue and Phthalocyanine Green.

The dispersant for pigment according to the present invention may favorably be used for disperding pigments usually in an amount of 50–150 parts by weight, preferably 80–120 parts by weight per 100 parts by weight of the pigment.

The dispersant for pigment according to the present invention can be applied in any coloring technique, such as dry coloring, color compounding and masterbatch preparation for coloring aromatic polymers. For instance, it can be used in coloring an aromatic polymer by a dry coloring or by a color compounding in such a way, that a mixture of the coloring pigment and the dispersant according to the present invention is finely disintegrated to prepare a dry color in a form of powder or beads and the resulting dry color is charged in an appropriate mixing device, such as tumbler, in a weighed proportion together with the pelletized aromatic polymer and the dry color is distributed uniformly over the polymer pellets by mixing therein, whereupon the mixture was supplied to an extruder or to a molding machine to effect therein melt kneading by screw to disperse the color homogeneously in the molten polymer by the shearing exerted therto by the screw, before it is molded. A color compound may also be prepared by extruding the melt kneaded mass from the extruder and by cutting the extrided rod into colored pellets.

The dispersant for pigment according to the present invention is superior in the ability for dispersing pigments in order to disperse it in an aromatic polymer uniformly and is also superior in realizing mechanical dispersing work by kneading. It excels also in achieving high transparency and stability of the color of the resulting blend of the aromatic poymer. The production costs of the ethylene/aromatic vinyl compound copolymer wax is low, since it can be produced easily in simple procedures by a copolymerization of ethylene with an aromatic vinyl compound or by a heat degradation of a high molecular weight ethylene/aromatic vinyl compound copolymer.

In conclusion, the dispersant for pigments for aromatic polymers according to the present invention excels in the ability for dispersing pigments in aromatic polymer and in the performance of stabilizing the resulting color, in addition to the advantage of being easily produced at lower cost, since it comprises a specific wax of ethylene/aromatic vinyl compound copolymer.

THE BEST MODE FOR EMBODYING THE INVENTION

In the following, the present invention will be described by way of Examples.

EXAMPLE 1

Production of Ethylene/Aromatic Vinyl Compound Copolymer Wax

A one liter reactor made of glass and equipped with a cooling pipe and a stirrer was charged with 494 ml of toluene and 6 ml of styrene after the reactor inside space was replaced sufficiently with nitrogen, whereupon the charge was saturated with ethylene under stirring. Then, the temperature of the reaction system was elevated to 35° C. and thereto were added 4.5 mmol of methylaluminoxane (as 10 wt. % toluene solution; obtained from TOSOH AKZO K.K.) and 0.045 mmol (as 0.01 mM toluene solution) of $\{(C_5Me_4)SiMe_2(N\text{-}t\text{-}Bu)\}TiCl_2$ {(tert-butylamido)dimethyl(tetramethyl-$\eta^5$-cyclopentadienyl)silanetitanium dichloride} so as to reach a mole ratio of aluminum to catalyst of 100. The polymerization was continued for 60 minutes at 40° C. while supplying thereto 7.0 N liter/hr of hydrogen and 100 N liter/hr of ethylene continuously.

After termination of the polymerization, 250 ml of isobutyl alcohol and 10 ml of aqueous hydrogen chloride solution were added thereto and the mixture was stirred with heating at 80° C. for 30 minutes. The reaction liquor containing isobutyl alcohol was transferred to a separating funnel and was rinsed twice each with 250 ml of water, before oil/water separation was effected. Then, the oil phase was poured into 3 liters of methanol to cause the product polymer to precipitate out. The precipitated polymer product was dried under vacuum at 130° C. for 12 hours, whereby an ethylene/styrene copolymer wax was obtained.

The so-obtained ethylene/styrene wax had an ethylene content of 90% by weight and a styrene content of 10% by weight and exhibited an intrinsic viscosity of 0.13 dl/g as determined at 135° C. in decahydronaphthalene. Using this ethylene/styrene wax (abbreviated hereinafter sometimes as ethylene/st wax) as a pigment dispersant, a performance evaluation was carried out by the following procedures.

Procedures for Performance Evaluation of the Pigment Dispersant 100 parts by weight of the fine powdery pigment dispersant and 100 parts by weight of fine powdery Phthalocyanine Blue were blended on a visually inspectable microtype mixer (V-shaped blender) of Tsutsui Kagaku-Ki K.K. to prepare a dry blend. This dry blend composition was kneaded on a triple roll kneader at 130° C. by passing therethrough three times. This kneaded composition was supplied together with a polystyrene product (trademark TOPOLEX, a product of Mitsui Toatsu Chemicals, Inc.) to a Brabender kneader, rotating at a revolution speed of 50 rpm and heated at 160° C., in such a proportion that the pigment concentration of the resulting kneaded product was 1.3% by weight to subject to kneading for 5 minutes.

This kneaded product was processed by pressing under a condition of press temperature of 170° C. into a film of a masterbatch having a thickness of 0.1 mm. The performance of pigment dispersibility in this masterbatch film was evaluated by the five-rank evaluation criterion given below, based on the observation by an image processer LVZEX 450 (trademark, Toyo Ink Mfg. Co., Ltd). The results are recited in Table 2.

Rank 5: number of particles having sizes of 50 μm or higher are less than $1.00 \times 10^3$ per 1 cm$^3$.

Rank 4: number of particles having sizes of 50 μm or higher are at least $1.00 \times 10^3$ per 1 cm$^3$ but less than $7 \times 10^3$ per 1 cm$^3$.

Rank 3: number of particles having sizes of 50 μm or higher are at least $7 \times 10^3$ per 1 cm$^3$ but less than $2.7 \times 10^4$ per 1 cm$^3$.

Rank 2: number of particles having sizes of 50 μm or higher are at least $2.7 \times 10^4$ per 1 cm$^3$ but less than $7.00 \times 10^4$ per 1 cm$^3$.

Rank 1: number of particles having sizes of 50 μm or higher are at least $7.00 \times 10^4$ per 1 cm$^3$.

The degree of haze of the masterbatch film was observed to determine the film haze. The lower the film haze value, the better is the transparency of the film. Also, the trend to sticking of the dry blend composition onto the roll upon kneading on the triple roll kneader and the occurrence of excessive load in the kneader moter were observed by the following evaluation criterion:

○ Better

Δ Moderate x Worse

The results are recited in Table 2.

EXAMPLES 2–5

Each an ethylene/styrene copolymer wax having material properties as given in Table 2 was produced in the same manner as in EXAMPLE 1 except that the feed rate of hydrogen gas was changed as given in Table 1. Using the ethylene/styrene copolymer wax, the performance evaluation test was carried out as in EXAMPLE 1. Results are given in Table 2.

EXAMPLE 6

An ethylene/styrene copolymer wax was produced in the same manner as in EXAMPLE 1 except that the catalyst used was changed to isopropylidene-bis(indenyl)zirconium dichloride. Using this ethylene/styrene copolymer wax, the performance evaluation test was carried out as in EXAMPLE 1. Results are given in Table 2.

Comparative Examples 1 and 2

An ethylene/styrene copolymer wax having material properties as given in Table 2 was produced in the same manner as in EXAMPLE 1 except that the feed rate of hydrogen gas was changed as given in Table 1. Using this ethylene/styrene copolymer wax, the performance evaluation test was carried out as in EXAMPLE 1. Results are given in Table 2.

TABLE 1

| Examples or Comp. | Charged Amt. (ml) | | Feed Rate (N liter/hr) | |
|---|---|---|---|---|
| Examples | Toluene | Styrene | Hydrogen | Ethylene |
| Ex. 1 | 494 | 6 | 7.0 | 100 |
| Ex. 2 | 492 | 8 | 7.0 | 100 |
| Ex. 3 | 492 | 8 | 2.0 | 100 |
| Ex. 4 | 490 | 10 | 2.0 | 100 |
| Ex. 5 | 485 | 15 | 2.5 | 100 |
| Ex. 6 | 494 | 6 | 7.0 | 100 |
| Comp. 1 | 494 | 6 | 0.5 | 100 |
| Comp. 2 | 499 | 1 | 7.0 | 100 |

TABLE 2

| | Dispersant Eth/st Wax | | Evaluated Performance | | |
|---|---|---|---|---|---|
| Example or Comp. Example | Styrene Content (wt. %) | Intrins. Viscos. (dl/g) | Dispersibility | Film Haze (%) | Workabil. *1 |
| Ex. 1 | 10 | 0.13 | 5 | 20 | ○ |
| Ex. 2 | 20 | 0.14 | 5 | 17 | ○ |
| Ex. 3 | 20 | 0.30 | 5 | 13 | ○ |
| Ex. 4 | 30 | 0.35 | 5 | 8 | ○ |
| Ex. 5 | 60 | 0.31 | 5 | 7 | ○ |
| Ex. 6 | 12 | 0.12 | 5 | 19 | ○ |
| Comp. 1 | 10 | 1.2 | — | — | x *2 |
| Comp. 2 | 0.5 | 0.13 | 5 | 45 | ○ |

*1: Workabilty on the triple roll kneader
*2: Excessively high load in roll driving Industrial Applicability The pigment dispersant for aromatic polymers according to the present invention is superior not only in the ability for dispersing pigments in the aromatic polymers but also in the ability of attaining a high transparency and a high stability of the resulting color in the polymer blend, so that it can be utilized favorably for coloring aromatic polymer with pigments by, for example, dry coloring, color compounding and masterbatch preparation.

What is claimed is:

1. A method for dispersing a pigment in aromatic polymers, comprising kneading the pigment with the aromatic polymers together with, as a dispersant, a wax composed of a random copolymer of ethylene and an aromatic vinyl compound, which has a content of structural unit derived from ethylene of 99–10% by weight and a content of structural unit derived from the aromatic vinyl compound of 1–90% by weight and exhibits an intrinsic viscosity of 0.04–0.6 dl/g.

2. A method as claimed in claim 1, wherein the wax is composed of an ethylene/aromatic vinyl compound copolymer obtained by copolymerization of ethylene with an aromatic vinyl compound in the presence of a metallocene catalyst and/or an ethylene/aromatic vinyl compound copolymer obtained by heat degradation of a copolymer resulting from copolymerization of ethylene with an aromatic vinyl compound in the presence of a metallocene catalyst.

3. A method as claimed in claim 1, wherein the aromatic vinyl compound is styrene.

4. A method as claimed in claim 1, wherein the ethylene/aromatic vinyl compound copolymer has a content of structural unit derived from ethylene of 96–40% by weight, a content of structural unit derived from the aromatic vinyl compound of 4–60% by weight and an intrinsic viscosity of 0.1–0.4 dl/g.

5. A dispersant and pigment composition for aromatic polymers, comprising a wax composed of a random copolymer of ethylene and an aromatic vinyl compound, which has a content of structural unit derived from ethylene of 99–10% by weight and a content of structural unit derived from the aromatic vinyl compound of 1–90% by weight and exhibits an intrinsic viscosity of 0.04–0.6 dl/g and a pigment, wherein the dispersant is in an amount of 50 to 150 parts by weight per 100 parts by weight of the pigment.

6. A dispersant pigment composition for aromatic polymers as claimed in claim 5, wherein the aromatic vinyl compound is styrene.

7. A dispersant and pigment composition for aromatic polymers as claimed in claim 5, wherein the content of structural unit derived from ethylene is 96–40% by weight, the content of structural unit derived form the aromatic vinyl compound is 4–60% by weight and the intrinsic viscosity is 0.1–0.4 dl/g.

8. An aromatic copolymer composition having dispersed therein the dispersant and pigment composition of claim 5.

* * * * *